(12) United States Patent
Russ

(10) Patent No.: US 9,690,090 B2
(45) Date of Patent: Jun. 27, 2017

(54) VISUAL TARGET ACQUISITION SCOPE SYSTEM

(71) Applicant: Yoachim C. Russ, Annapolis, MD (US)

(72) Inventor: Yoachim C. Russ, Annapolis, MD (US)

( * ) Notice: Subject to any disclaimer, the term of this patent is extended or adjusted under 35 U.S.C. 154(b) by 0 days.

(21) Appl. No.: 14/794,605

(22) Filed: Jul. 8, 2015

(65) Prior Publication Data
US 2016/0377853 A1 Dec. 29, 2016

Related U.S. Application Data

(63) Continuation of application No. 13/134,918, filed on Jun. 20, 2011, now abandoned.

(60) Provisional application No. 61/397,926, filed on Jun. 18, 2010.

(51) Int. Cl.
| | | |
|---|---|---|
| *G02B 23/00* | (2006.01) | |
| *G02B 23/14* | (2006.01) | |
| *F41G 11/00* | (2006.01) | |
| *F41G 1/34* | (2006.01) | |

(Continued)

(52) U.S. Cl.
CPC ............. *G02B 23/14* (2013.01); *F41G 1/345* (2013.01); *F41G 1/38* (2013.01); *F41G 11/004* (2013.01); *G02B 23/18* (2013.01)

(58) Field of Classification Search
CPC ... F41G 1/387; F41G 1/00; F41G 1/38; F41G 1/473; F41G 1/04; F41G 1/35; F41G 1/425; F41G 1/30; F41G 1/40; F41G 1/383; F41G 1/345; F41G 1/08; F41G 1/54; F41G 1/16; F41G 1/28; F41G 1/26; F41G 1/18; F41G 1/17; F41G 1/02; F41G 1/32; F41G 11/001; F41G 11/003; F41G 11/008; G02B 13/00; G02B 23/00; G02B 23/12; G02B 23/14; G02B 23/145; G02B 23/16; G02B 23/18; G02B 23/2446; G02B 7/002; G02B 7/06; G02B 15/00
USPC ........ 359/362, 399–409, 411, 412, 414, 416, 359/417, 415, 419–424, 428–429, 432, 359/434–435; 42/111–143, 146; 396/429–431; 348/73, 75
See application file for complete search history.

(56) References Cited

U.S. PATENT DOCUMENTS

| | | | | |
|---|---|---|---|---|
| 3,829,194 A | * | 8/1974 | Van Exel | ................ G02B 7/12 359/417 |
| 4,531,321 A | * | 7/1985 | Bechtel | ................ F41G 11/003 42/126 |

(Continued)

*Primary Examiner* — Stephone B Allen
*Assistant Examiner* — Jyotsna Dabbi
(74) *Attorney, Agent, or Firm* — Lawrence G. Fridman, Esq.; Feigin & Fridman, LLC

(57) ABSTRACT

A visual target acquisition scope system including an adjustable connection between a zero magnification scope viewed by a first eye of a user and a power scope viewed by a second eye of the user. The system includes first and second movable sections connected and controlled by an adjustment locking mechanism. Using the system, while the user looks at an object through the zero magnification power scope with the first eye and looks at the object through the high power scope with the second eye, the target visible to the first eye is simultaneously visible to the second eye, so as to provide immediate acquisition and viewing of the object through the high power scope with the second eye.

16 Claims, 20 Drawing Sheets

(51) Int. Cl.
*F41G 1/38* (2006.01)
*G02B 23/18* (2006.01)

(56) References Cited

U.S. PATENT DOCUMENTS

| | | | | |
|---|---|---|---|---|
| 4,669,833 A * | 6/1987 | Mise | ................... | G02B 23/16 359/420 |
| 5,938,155 A * | 8/1999 | Garland | ................ | F16M 11/04 248/177.1 |
| 7,367,152 B2 * | 5/2008 | Samson | ................ | F41C 27/00 42/128 |
| 2007/0064307 A1 * | 3/2007 | Hluchan | ................ | G02B 7/002 359/407 |
| 2007/0177842 A1 * | 8/2007 | Clark | ................... | G02B 6/4226 385/52 |

* cited by examiner

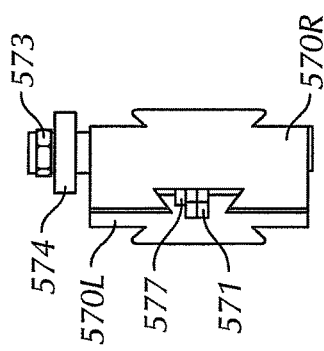
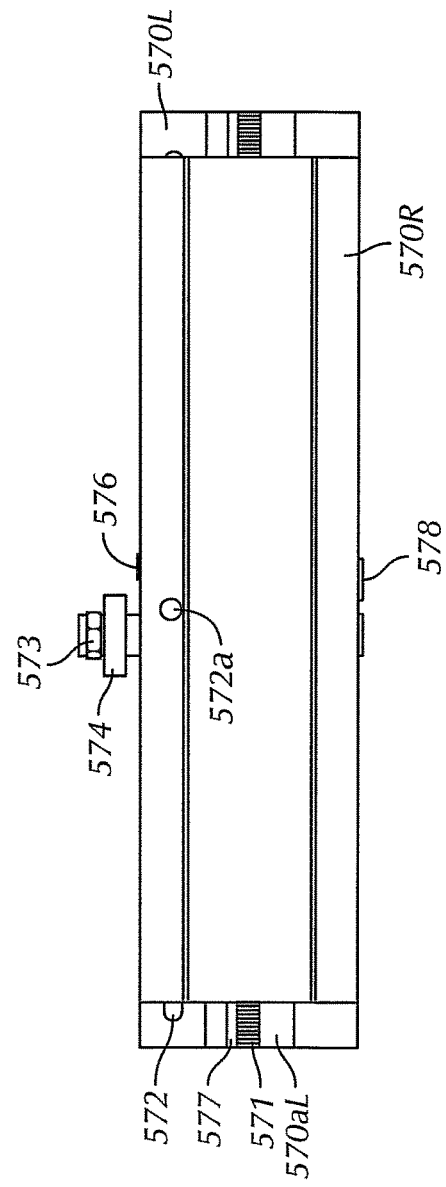
FIG. 22
FIG. 23

VISUAL TARGET ACQUISITION SCOPE SYSTEM

CROSS REFERENCE TO RELATED APPLICATIONS

This Application is a Continuation of U.S. Patent Application U.S. application Ser. No. 13/134,918 Filed: Jun. 20, 2011 currently pending, which Application claims priority to U.S. Provisional Patent Application No. 61/397,926 filed Jun. 18, 2010, which Application is hereby incorporated in its entirety by reference.

FIELD OF THE INVENTION

The present invention relates to the field of optical devices in general, and more particularly it relates to a visual target acquisition system for high power scopes.

BACKGROUND OF THE INVENTION

It is known that looking through a high power scope at an object often offers a narrow field of view. In fact, an increase in the power, or magnification, results in a decrease, or further narrowing of the field of view. In the field of optics, the power or magnification is the amount of enlargement one uses over what the naked eye sees naturally. This is typically expressed in numbers followed by an × sign. Zero magnification is expressed as 1×, double the magnification is 2×, and ten times is 10× and so on.

The difficulty of viewing any object through a high power scope comes in various forms. One difficulty is in finding the object and viewing it. This process is also known as "target acquisition". Another difficulty is in maintaining a target in the magnified field of view for the duration of the viewing period or as long as needed by a viewer.

U.S. Pat. No. 4,669,833 to Mise, discloses Spotting Scope With Alignment Viewer. In this Patent, while a low power scope affords a wider field of view than a high power scope, it still does not provide the widest possible field of view. The view finder body is rigidly joined to the spotting scope body. This does not allow for any needed adjustments for viewing targets at different distances. Furthermore, the device of the Mise Patent does not allow for simultaneous viewing with both eyes through both scopes. This forces the viewer to constantly move his/her gaze from one scope to the other, thereby risking not finding or losing the target altogether.

U.S. Pat. No. 5,930,036 to Cluff discloses Binocular Spotting Scope Assembly. The assembly of the Cluff Patent suffers from the following shortcomings. While binoculars are used to aid in finding a target, a binocular does not afford a wider field of view than a monocular (single barrel) scope with the same power. According to the Cluff Patent, the lines of vision of the binocular and the spotting scope cross at a point forward of the assembly. This indicates that if a target is found in the center of the binoculars' field of view, at a particular distance, it can then be viewed in the center of the spotting-scope. However, if the distance to the target changes, it will no longer be in the center of view. In fact it might be completely out of the field of view. There will be a need to adjust the angle between the binocular and the spotting-scope. Constant adjustments of this setup will result in constant misalignments. It could also result in a complete loss of potential targets. The setup of the Cluff Patent does not allow for simultaneous viewing with both eyes through the binoculars and the spotting scope. This forces the viewer to constantly move his/her gaze and risks losing the target or not finding it at all.

In the case of the Binocular With Disparate Fields Of View, disclosed by U.S. Pat. No. 7,466,481 to McCabe, the field of view afforded by the low power, 4×-7×, side of the "binocular with disparate field of view", is still narrow when compared to the widest field of view allowed by a 1× scope. Furthermore, viewing a target, in the distance, through the two different magnifications of the disparate optical systems is not the same as viewing the world through two disparate lenses at the base of one's nose, as in prescription glasses. This is because every lens system, arrayed on an optical axis (lenses arranged in line in a single tube or barrel), suffers some imperfections or aberrations. In a regular binocular two symmetrical optical lens systems are put together. That is why the relative aberrations in a binocular are not pronounced enough to cause a major problem and might never be noticed. However, if they are not symmetrical, as in the McCabe Patent, the disparate aberrations will degrade the quality of the picture and cause confusion in the mind of the viewer.

Thus, it has been a need for a definitive, simple, compact, economical and universal visual target acquisition system. There is also a need for a system that allows the widest possible field of view, that provides a superimposed point of reference in that field of view, so as to aid in finding any target no matter at what the distance to the target is located. It has been a further need for an optical system that allows the simultaneous and immediate magnified viewing of such target.

SUMMARY OF THE INVENTION

The present invention provides a rapid visual target acquisition by means of a system which comprises a red dot scope with zero (1×) magnification and a high power scope. This system allows a simultaneous use of such optical devices as, for example, the 1× red dot scopes with high power spotting scopes, riflescopes and star gazing scopes. The system of the invention brings together a 1× power scope with a high power scope in a particular novel way. Since a 1× scope provides the widest possible field of view, it allows for the rapid locating of any target with one eye. Combining with the high power scope simultaneously provides the other eye with a magnified view of that target.

Once both scopes are combined by the target acquisition arrangement of the invention and the distance between the scopes is set to accommodate the viewer's Interpupillary Distance (IPD), it is a simple matter of placing the red dot on a target and immediately viewing it magnified. After a few moments a human brain focuses on viewing through the high power side. If the target moves, the brain shifts some of its focus from the high power side to the red dot and the target is reacquired immediately and without conscious effort The design and precise execution of the assembly of the invention results in the automatic optical plane alignment of the 1× red dot scope and the high power scope, thereby reducing the need for multiple adjustments. The red dot in the 1× scope superimposes a centered point of reference in the field of view. This not only aids in acquiring any target rapidly, it also eliminates the need for constant adjustments as the distance to a target changes.

The system of the invention is capable of adjusting the distance between the scopes to match the unique Interpupillary Distance (IPD) of any user. The viewer uses both eyes simultaneously, in a comfort, to find and view any target.

BRIEF DESCRIPTION OF THE DRAWINGS

Exemplary embodiments of the invention will be now described in greater detail herein below with reference to the accompanying drawings, in which:

FIG. 22 is a rear elevational view thereof;

FIG. 23 is a side elevational view thereof;

Figure 1:
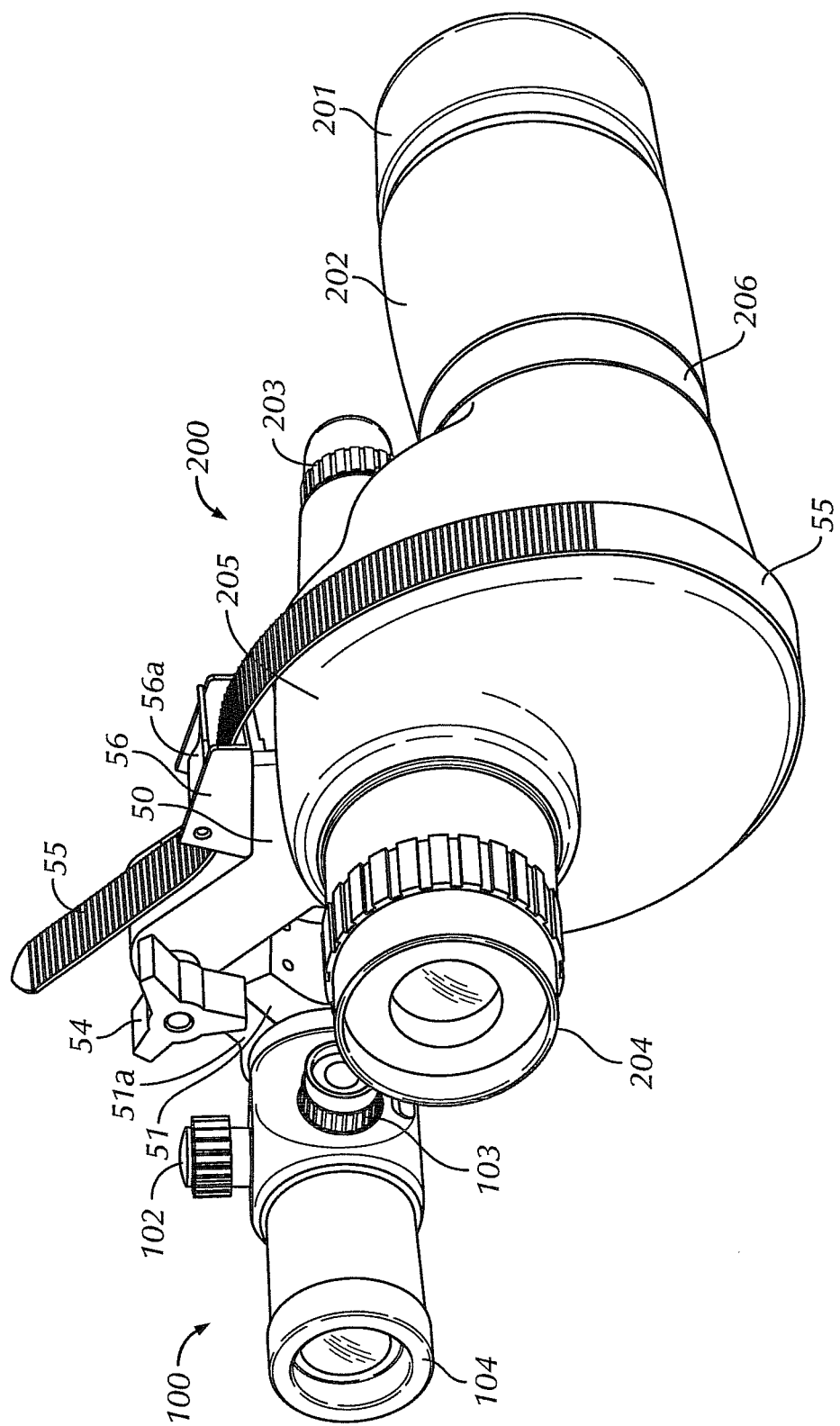
FIG. 1 is a perspective view of the pivot embodiment of the system on the invention showing a spotting scope on a right side and a red dot scope on a left side.

It should be noted that in the drawings and description of the application, right eye dominance is assumed. However, the system of the invention can be easily reconfigured accommodate a person with left eye dominance.

DETAILED DESCRIPTION OF THE INVENTION

FIGS. 1-5, illustrate one embodiment of the system of the invention having a pivot-type visual target acquisition scope arrangement. The arrangement comprises a target acquisition assembly 10 with the universal base 50 and the clamp pivot 51 adjustably combining/connecting a zero magnification scope or a red dot scope 100 to a power scope or a spotting scope 200.

A universal base 50 is associated with a prism housing section 205 of the spotting scope 200. The position of where the base is placed, fore or aft, determined according to configuration of the individual spotting scope and red dot scope. It is essential that both eyepieces 104 and 204 are disposed within the same plane and at an approximate even distance from the viewer's eyes when placed against the scopes in a face on position, not turned sideways.

Figure 4:
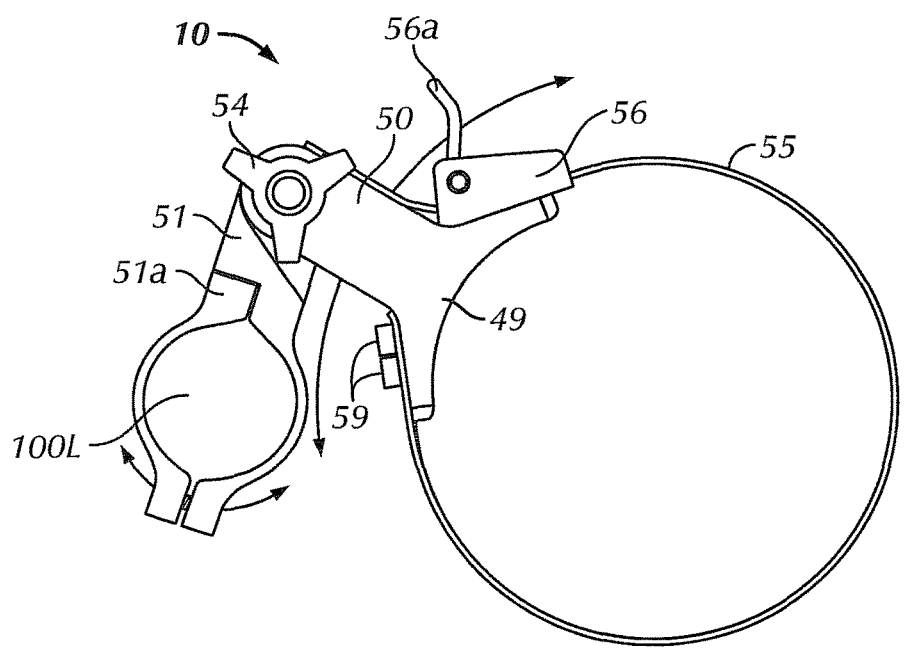
FIG. 4 is a rear elevational view thereof.
Figure 5:
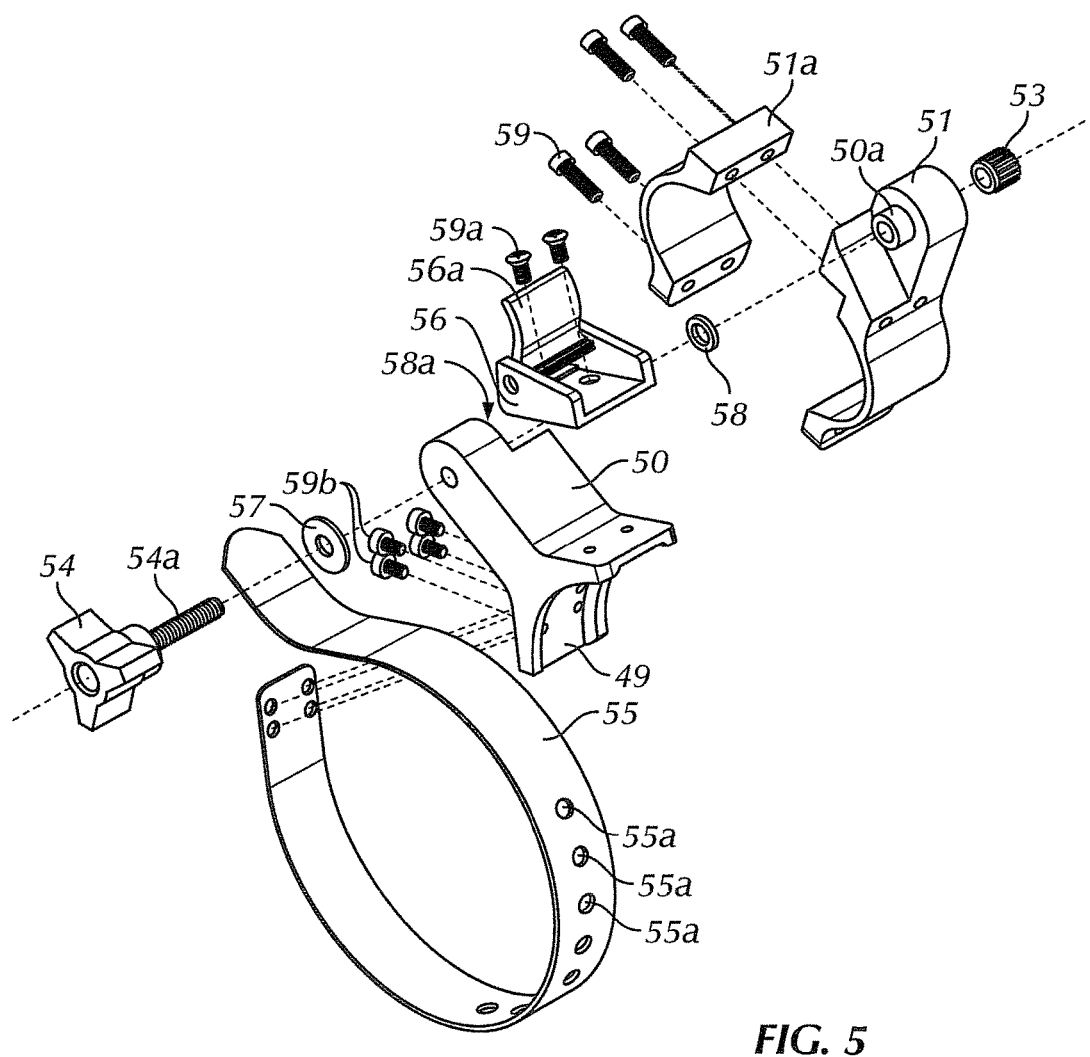
FIG. 5 is an exploded perspective view thereof.

The universal base 50 is secured to the spotting scope 200 by a flexible member or strap 55 and a strap lock 56. The length of the flexible member 55 depends on an outer perimeter of the individual spotting scope at a respective area of prism section 205. In one embodiment, the flexible member or strap 55 is secured with multiple fasteners 59b at one side of the universal base 50. The lock 56 is secured by any conventional means including fasteners 59a to a side of the universal base 50 opposite to that receiving the strap. The flexible member or strap 55 surrounds and tightens the spotting scope 200 down, and enters the lock 56 with the strap lock lever 56a being in an unlocked position. In FIGS. 2, 4 and 5 in the unlocked position the lever 56a points up. When strap 55 is tightened, so as to lock the spotting scope 200 and the strap lock level 56a is lowered within the assembly (see FIG. 1). Thus, the universal base 50, therefore the entire assembly is secured. In an alternate embodiment, upon the viewer/user concluding that the position of the universal base 50 is firmly established, the assembly can be made permanent. This eliminates the need for the strap 55 and the strap lock 56. Such permanent structure can be formed by securing the universal base 50 to the spotting scope 200 in any conventional manner.

Formation of the system of the invention is illustrated in FIGS. 1, 2, 4 and 5 showing how the zero magnification or red dot scope 100 is inserted and secured within the pivot assembly, between a clamp pivot 51 and a clamp saddle 51a. In the preferred embodiment this can be accomplished by loosening fasteners 59 and inserting the red dot scope from behind into a space 100L (see FIG. 4, for example). When the red dot scope 100 is installed in the desired position, the clamp saddle 51a is then secured by tightening the fasteners 59.

The embodiment of FIGS. 1-5 the universal base 50 is positioned on top of the high power or spotting scope 200. The arc-shaped portion 49 formed at the bottom part of the base 50 receives and accommodates the exterior of a great variety of scopes. In this manner, the universal base 50 of this embodiment can be positioned in a very stable way on a great variety of individual scopes. The flexible element or band 55 cooperates with the universal base 50 and the locking mechanism 56, so as to surround the spotting or high powered scope 200. The combination of clamp pivot 51 and clamp saddle 51a defining the receiving space 100L accommodates an exterior of practically any conventional red dot scope. The pivot arrangement allows adjustment of the system of the invention to practically any distance between human pupils. In this manner, the invention covers a great range of distances from the narrowest distance between eyes to the widest.

In the preferred embodiment, the universal base 50 and the clamp pivot 51 assembly are put together in the following manner. Initially, a spacer 57 is inserted over the adjustment locking knob's 54 engaging area 54a. Then the adjustment locking knob 54 is inserted into the hole at the top of the universal base 50. After that, a lock spacer 58 is inserted over the engaging area 54a of the adjustment locking knob 54 and into a bore 58a in same universal base 50. Finely, the clamp pivot 51 is brought together with universal base 50 when the boss 50a, at the top of the clamp pivot 51, is inserted into the bore 58a, at the top of the universal base 50. The process is finalized by the adjustment locking knob 54 being positioned into a tightening member 53, and then tightened.

The tolerances of the inner wall and the depth of the counter bore 58a in the universal base 50 and the outer wall and the height of boss 50a are similar to that of the pivot design assembly having a very snug fit without fully tightening the adjustment locking knob 54. When the adjustment-locking member 54 is fully tightened, the flat surface below and around the boss 50a comes into a contact with the flat outside surface around the counter bore 58a. In addition, the boss 50a simultaneously flattens the lock spacer 58 inside the counter bore 58a in the universal base 50 for a very positive lock.

When a slight adjustment in the pivot design assembly is needed, it takes only a limited adjustment of the adjustment-locking member 54. This loosens the positive lock by springing the lock spacer 58 from its flat position, yet keeping the universal base 50 and the clamp pivot 51 very snug. In this manner there is no wobbling when adjustments are made. As soon as the desired adjustment IPD is achieved, the adjustment locking member 54 is turned and the assembly is secured in its new setting.

Figure 2:
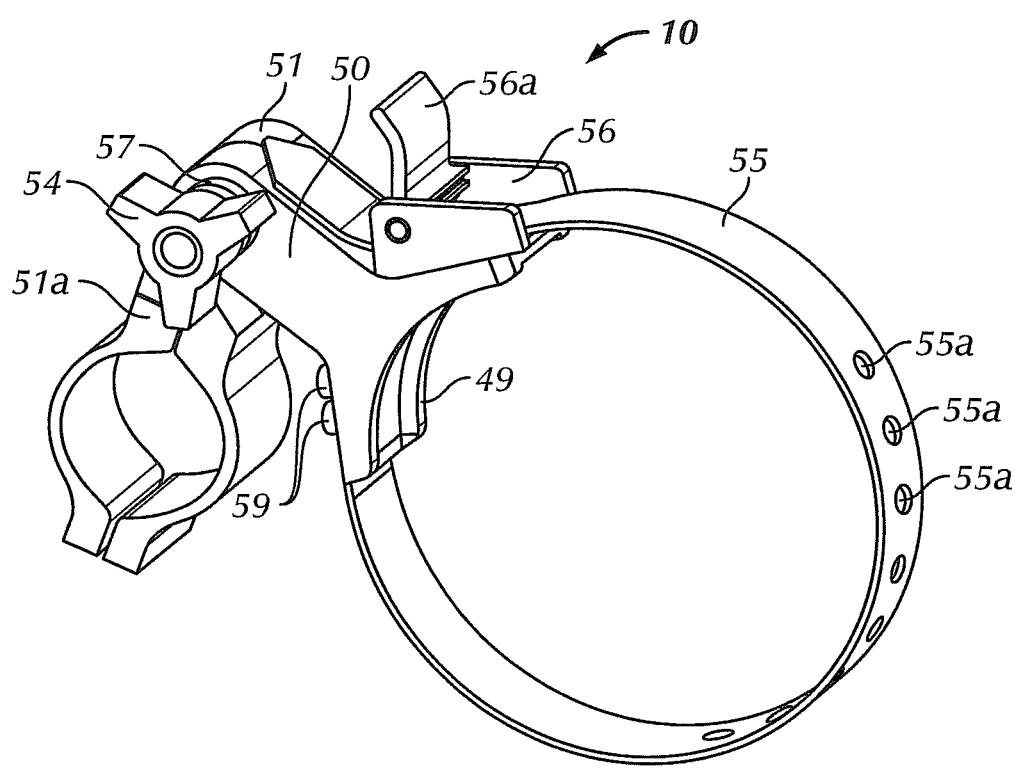
FIG. 2 is a perspective view of the pivot assembly (without the spotting and red dot scopes)
Figure 3:
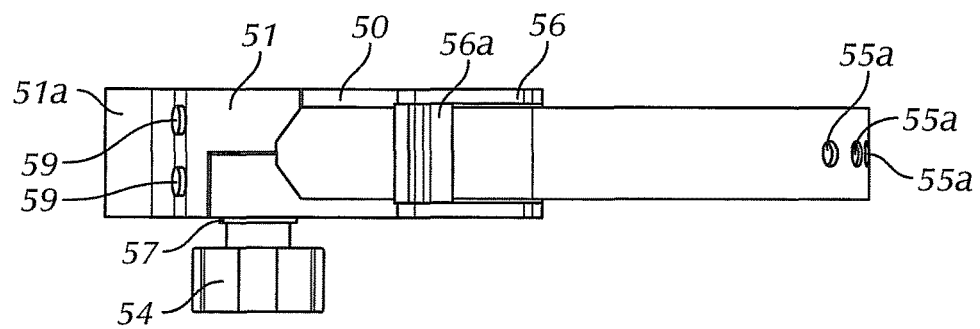
FIG. 3 is a top plan view thereof.

In operation of the system, initially the pivot assembly is loosely positioned on the spotting scope 200 (see FIG. 1). Then, the adjustment-locking member 54 having an engaging section 54a can be slightly loosened. Adjustable connection between a zero magnification scope viewed by a first eye of a user and a power scope viewed by a second eye of the user, the system comprising:

If the two eyepieces, 104 and 204 are not on a horizontal plane or their optical axes are not parallel to each other, the universal base 50 will then be moved as illustrated by the arrows in FIG. 4, until a horizontal plane is achieved. If at that point, the distance between the eye pieces 104 and 204 changed, the clamp pivot 51 will also be moved up or down accordingly. Even if the IPD's exact measurement is not known, the same procedure will be followed by simply looking through the eyepieces 104 and 204, as the universal base 50 and the clamp pivot 51 are being adjusted until the viewer gets a visual and/or mental indication that the optimal IPD has been achieved. At this point the adjustment locking knob 54 and the strap lock 56 are tightened. Index lines visible on top of the universal base 51 and a corresponding index line (1) FIGS. 2, 3, and 5, can be provided so as to provide the viewer a reference for quick setting up in the future.

Although, the embodiment of FIGS. 1-5 have been described with reference to a particular design of the universal base 50 and the clamp pivot 51 including the clamp saddle 51a, it should be obvious that variations of this embodiment are within the scope of the invention. For example, the lock 56 can be secured to the universal base by any conventional manner, such as for example, gluing, welding, etc. In attaching, the clamp saddle 51a to the clamp pivot 51, any conventional way of accomplishing this task also forms a part of the invention. As an example, the scope 100 can have a standard 25 mm-28 mm inside diameter (ID), 30 mm outside diameter (OD).

Figure 6:
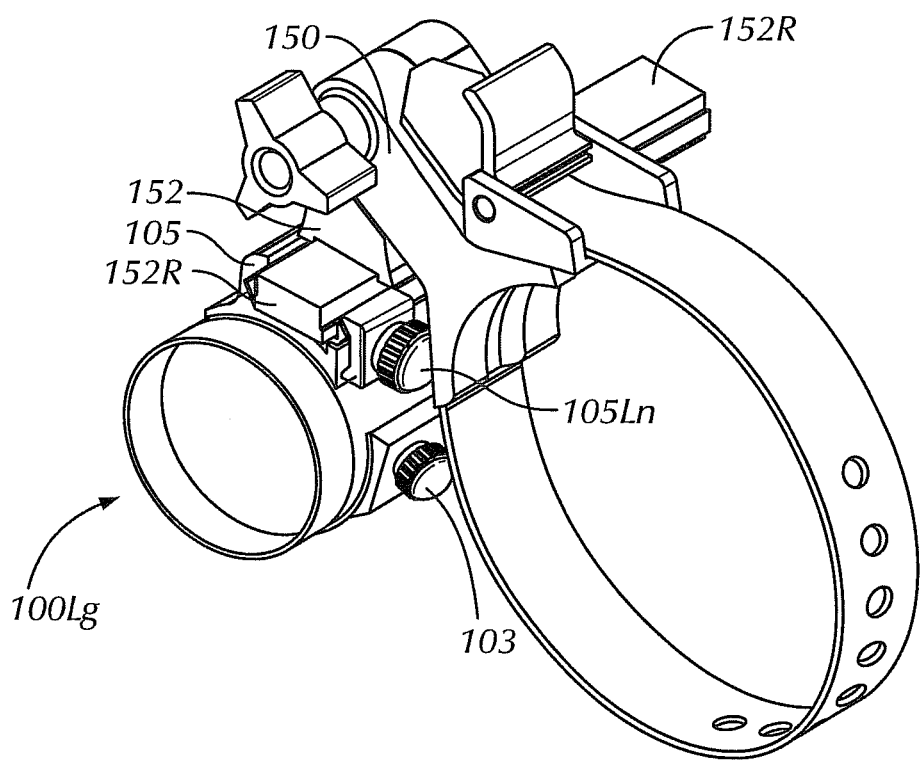
FIG. 6 is a perspective view of the pivot assembly having T-shaped configuration.
Figure 7:
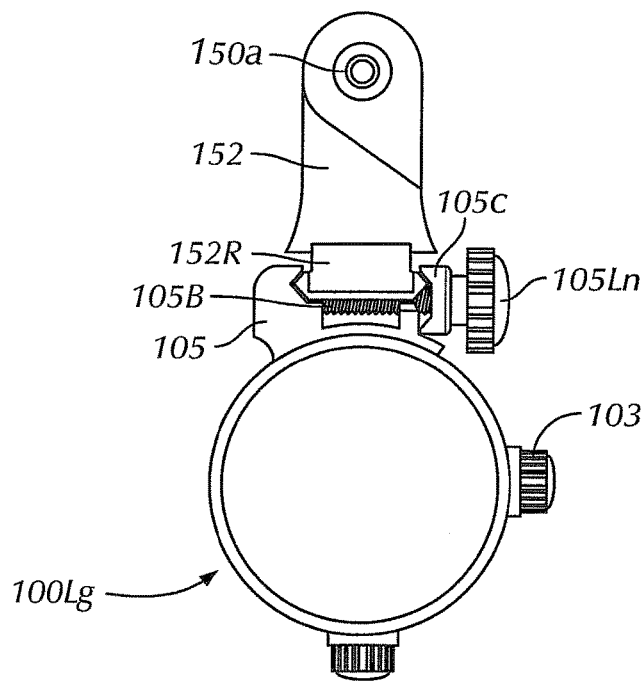
FIG. 7 is a rear elevational view of the T-shaped pivot arrangement.
Figure 8:
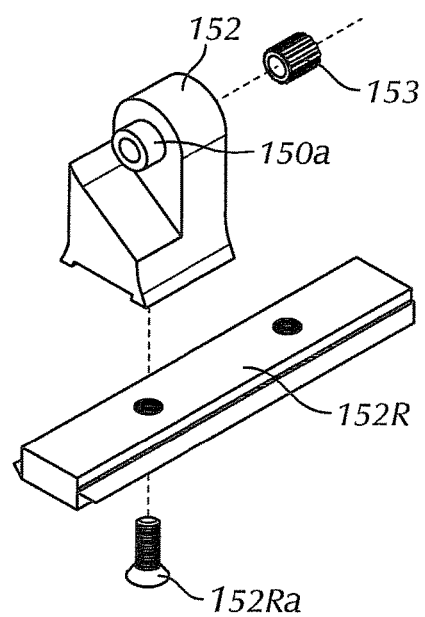
FIG. 8 is an exploded view thereof.

Referring now to FIGS. 6, 7 and 8, illustrating an embodiment of the system of the invention having a T-shaped pivot arrangement. The red dot scopes having larger inside diameter, and therefore even larger outside diameter, require a different way for attaching same to the universal base 50 of the previously discussed pivot design attachment. That is because many of such scopes are often provided with an integrated rail. Such rail 105 illustrated in FIGS. 6 and 7, is formed as part of the zero magnification, red dot scope tube. This makes it very difficult to use the clamp pivot 51 and the clamp saddle 51a of the previously discussed pivot design assembly to mount such a scope. In the embodiment of FIGS. 6-8 a T-shaped pivot 152 and the T-shaped pivot rail 152R are provided to accommodate the integrated rails 105.

As depicted in FIG. 6, the universal base 150 and the related parts, other than the T-shaped pivot 152 and pivot rail 152a, etc. are similar to those illustrated in FIG. 1-5. Furthermore, since the way the universal base 150 is attached to the spotting scope and the adjustments thereof, have been previously covered in substantial detail, and will not be repeated here.

As illustrated in FIG. 6, the T-shaped pivot 152 accommodates the large red dot scope 100Lg. FIG. 8 shows how the T-shaped rail 152R fits into the notch at the bottom of the T-shaped pivot 152 and is secured with a fastener 152Ra. The bottom of the T-shaped pivot 52 has been formed to receive the T-shaped pivot rail 152R. The two parts, 152 and 152R, are at substantially right angles to each other and are in line with each other. As seen in FIG. 8, the T-shaped pivot rail 152R extends on either side of T-shaped pivot 152. As seen in FIG. 8, there are multiple openings formed in the rail 152R. This allows enough flexibility in setting the rail 152R fore and aft into the T-shaped pivot 152. This allows the zero magnification or red dot scope with integrated mounting rails 105 to arrange its eyepiece 100Lg to align with the power or spotting scopes eyepiece 204.

FIG. 7, illustrates how the large red dot scope 100Lg is mounted on the T-shaped pivot rail 152R. First, the locking fasteners 105Ln are loosened. This allows the rail clamps 105C to move away from the integrated rail 105 widening the space between them until the T-shaped pivot rail 152R fits in between them. Then, by tightening the locking fasteners 105Ln, the rail clamps 105C squeeze the T-shaped pivot rail 152R against the large red dot scope 100Lg integrated rail 105, thereby securely mounting the large red dot scope 100Lg onto the pivot design attachment.

Since position of the rail 105 on the red dot scope is very specific, the arrangement of this embodiment is very precise. This embodiment does not allow a rotational motion of the red dot scope 100Lg within the bracket. The embodiment assures a longitudinal motion of the red dot scope within the bracket of the T-shaped arrangement and the radial motion of the red dot scope through the pivotal connection. However, the rotational motion of the red dot scope is inhibited.

Because the T-shaped pivot 152 and the previously discussed clamp pivot 51 use the identical universal base, the mounting procedure onto the spotting scope 200 is very similar. In addition, the process of adjusting for the proper IPD is also identical for both. This process has been fully described before and is not repeated here.

Figure 9:
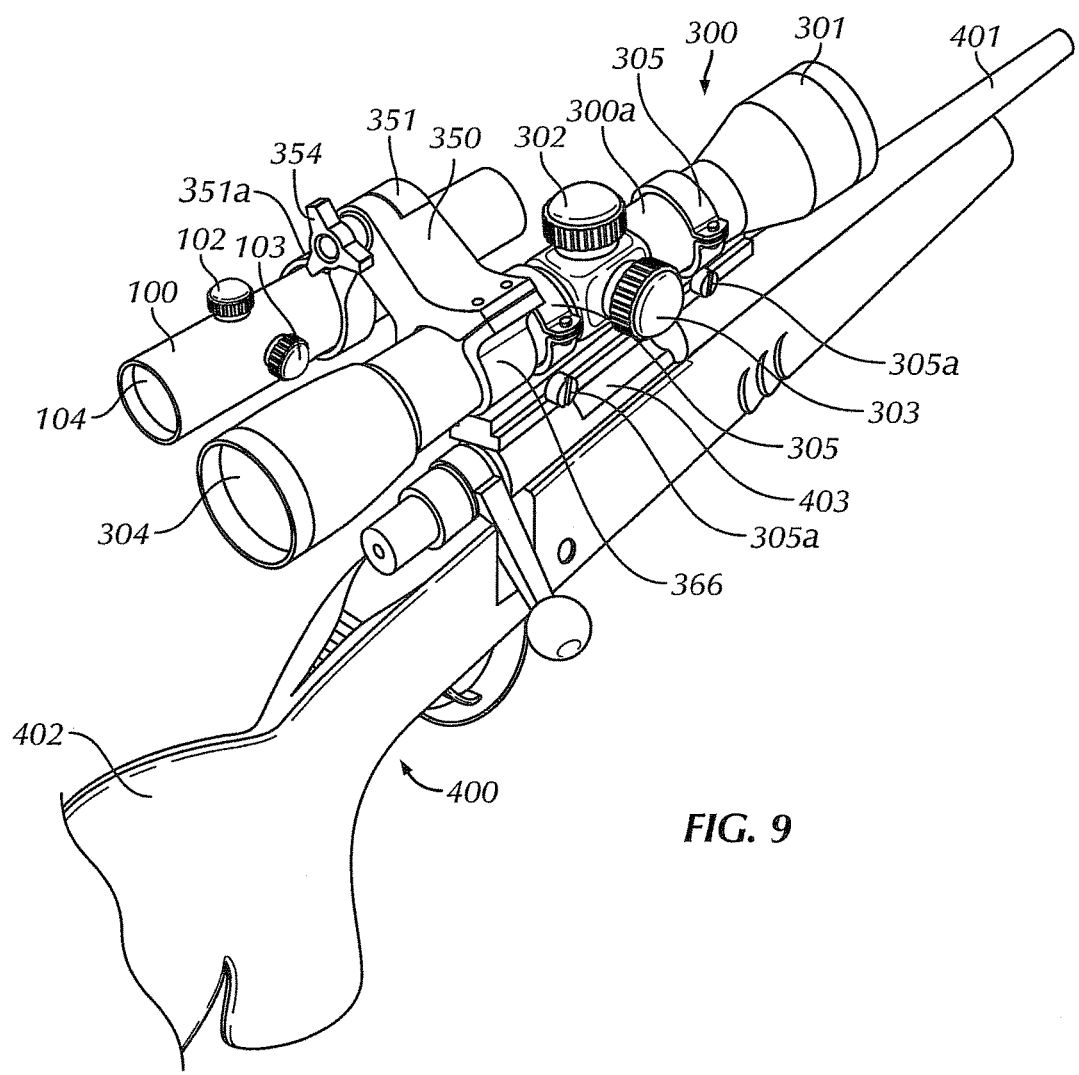
FIG. 9 is a perspective view of the pivot assembly mounted on a Long Rifle scope with a red dot scope attached.

Referring now to FIGS. 9-13 illustrating the embodiment of the pivot assembly of the invention adapted to accommodate a standard Long Rifle (LR) as it is mounted on a riflescope 300. FIG. 9 shows the pivot assembly where the red dot scope 100 is attached to the riflescope 300 associated with a rifle 400. FIGS. 10, 11, 12 and 13 show the assembly with the rifle and scopes being removed for better clarity.

Referring now to FIG. 9 showing that the riflescope 300 is attached to the rifle via mounting rings 305, attached to two mounting rings bases 305a, which are connected to the rifle 400 fore and aft of the breach area. In one embodiment, the universal base 360 is positioned over the riflescope tube 300 between the rear mounting ring 305 and the scope eyepiece 304. The location of attaching the universal base 60 to the universal base clamp 366 is based substantially on the following two factors: (1) the availability of an open space on the tube 300a; and (2) the location on the tube 300a of an adjusting knob 302 controlling fore or aft of the elevation 302 and an adjusting knob 303 controlling the windage. It is essential for the invention that when the red dot scope 100 is mounted on the rifle scope 300, the respective eyepiece 104 does not go aft of the rifle scope eye piece 304 and interfere with the shooter's preferred eye relief. For the purposes of the invention it is assumed that, the eye relief is the distance from the eye to the first lens in the eyepiece.

Figure 10:
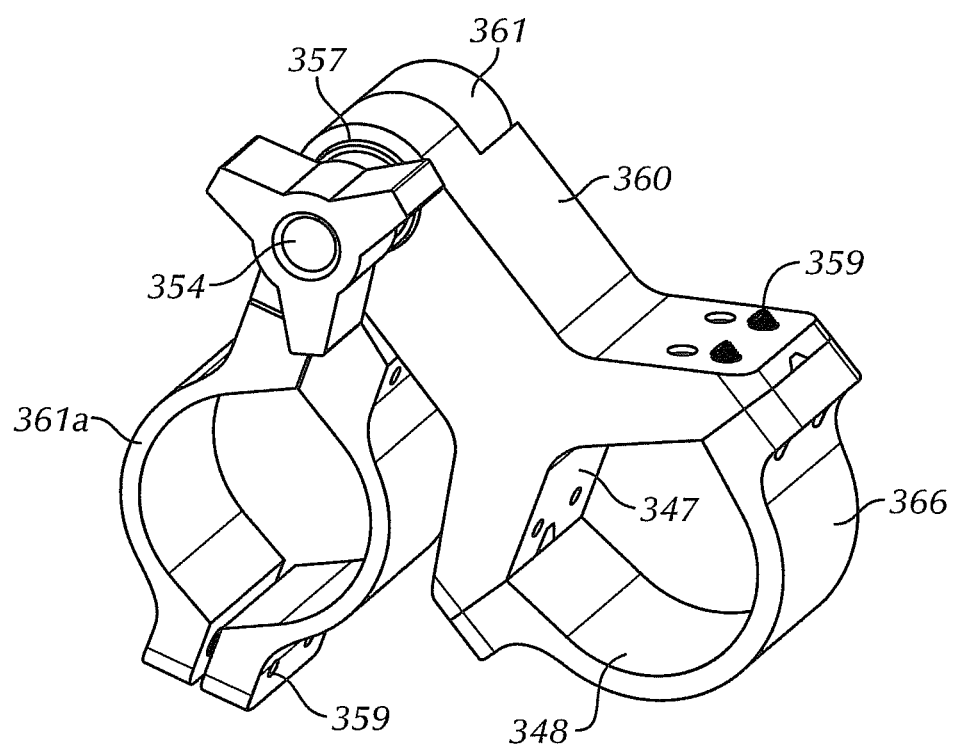
FIG. 10 is a perspective view of the pivot assembly with the riflescope and red dot scope removed.
Figure 11:
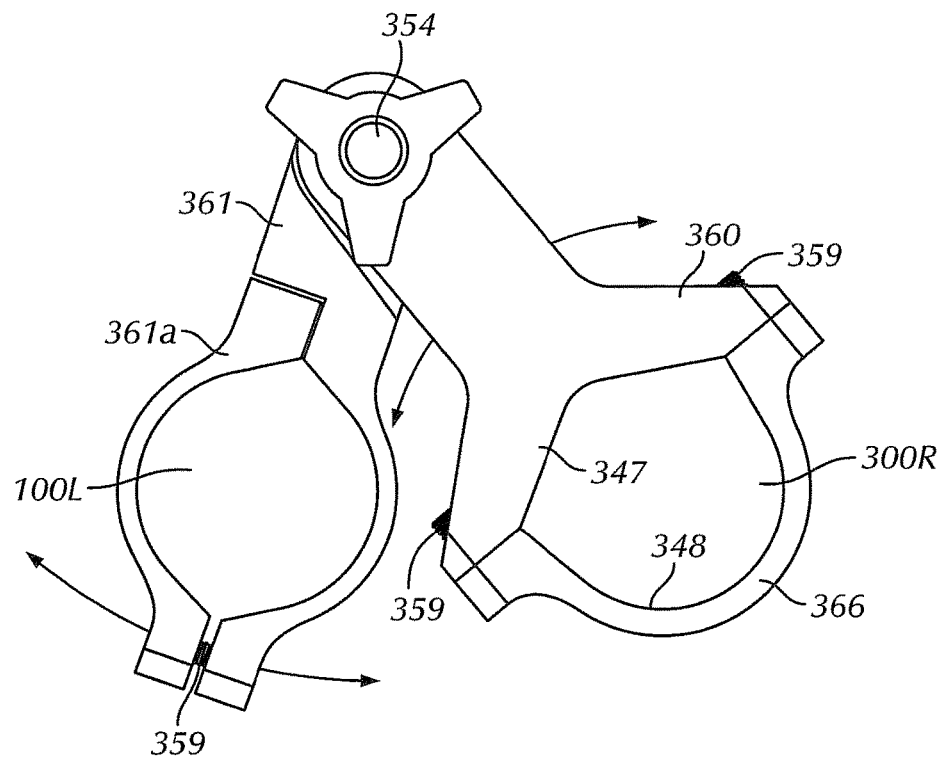
FIG. 11 is a rear elevational view thereof.
Figure 12:
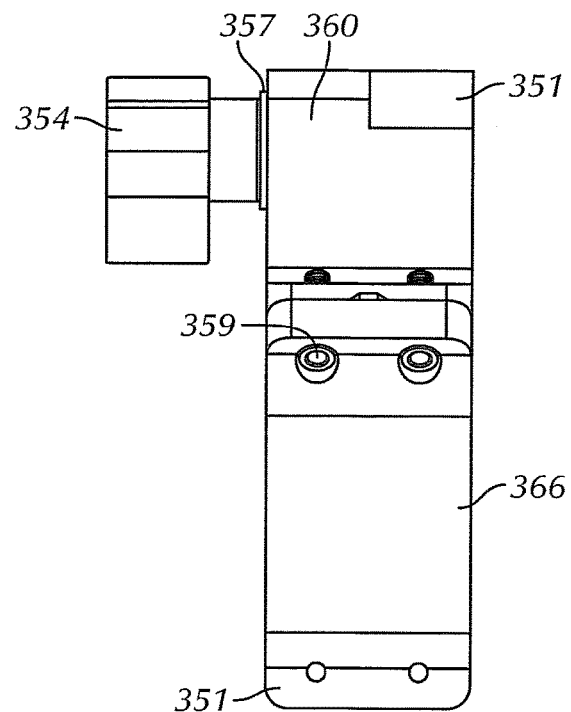
FIG. 12 is a side elevational view thereof.
Figure 13:
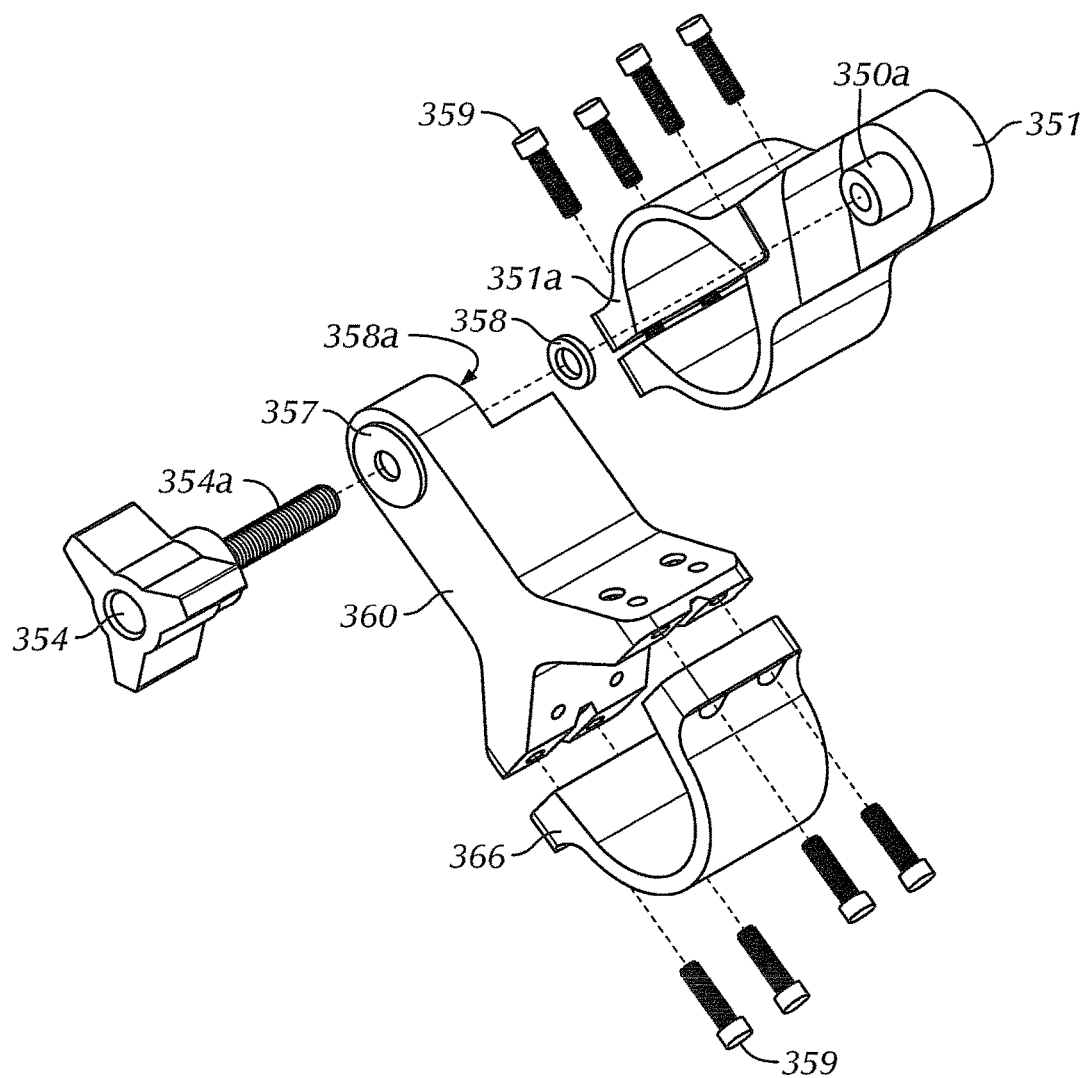
FIG. 13 is an exploded perspective view thereof.

Referring now to FIGS. 10, 11 and 13 illustrating systematic relationships between the scopes 100 and 300. As the initial step, the bottom of the universal base 360 is first mounted on to the riflescope tube 300a. It is then matched with the universal base clamp 366 mounted at the bottom of the rifle scope main tube 300a and is secured by fasteners 359, which enter through universal base clamp 366 into a universal base 360 (see FIG. 13) and are only snugged in.

Then, the red dot scope 100 is mounted in between the clamp pivot 361 and the clamp saddle 361a with the fasteners 359 entering through clamp saddle 361a and snuggly engaging the clamp pivot 361 (see FIGS. 10 and 11) and are only snugged in.

After that the adjustment-locking member 354 having an engaging section 354a, is slightly loosened and the spaces between the left space for the red dot scope 100L and the right space for the riflescope 300R are set for the IPD of a user. This is accomplished by tilting the clamp pivot 361 up or down as illustrated by the arrows shown in FIG. 11. Such motion is achieved by using the boss 350a, the corresponding bore 358a and the engaging section 354a of the adjustment member 354 as the pivoting point (see FIG. 13). When the center of the left space for the red dot scope 100L, or the red dot scope eyepiece 104 and the center of the right space for the riflescope 300R, or the riflescope eyepiece 304, correspond to the individual viewers IPD, the adjustment member 354 is tightened to provide a positive lock.

In view of the interference of the rifle stock cheek rest 402, in order for the shooter to look through the center of the rifle scope 300, the head tilts at an angle towards the rifle. This puts the left eye above the right eye. To maintain the ability of the shooter to look through the centers of both scope eyepieces, the universal base 360 should be tilted from a horizontal position to one matching the angle of the head leaning. This is done by using the rifle scope 300 as the pivoting point, as shown by the arrows in FIG. 11. The process should be accomplished by emanating to the left and right from the universal base 360 until the right eye is looking through the center of the rifle scope eye piece 304 and the left eye is looking through the center of the red dot scope eye piece 104. When that is achieved, the fasteners 359 attaching the universal base clamp 366 into the universal base 360 can be finally tightened.

The embodiment of FIGS. 9-13, illustrates installation of the target acquisition assembly of the invention on a rifle. This occurs in such a manner so as to provide a pivotal connection between the red dot scope and the high power scope of the rifle, and to accommodate various designs of the rifle scopes. As illustrated in FIGS. 10 and 11, an inner area 348 of the base clamp 366 has a u-shaped configuration, whereas the bottom inner area 347 of the universal base 360 has a v-shaped configuration. The combination of the u-shape and v-shape areas in the receiving opening 300R, enable the invention to accommodate a great variety of the rifle scopes. Since the u-shaped area 348 of the base clamp receives a cylindrical portion of the rifle scope housing, the v-shape area 347 locks the rifle scope housing within the u-shaped seat of the base clamp 366.

It should be obvious that many variations and modifications of the above-discussed pivot assembly of FIGS. 9-13 are contemplated by the invention. For example, the adjustment member 354 can be substituted by other conventional arrangements controlling the motion between the left and right spaces of the assembly. Furthermore, the universal base clamp 366 can be attached to the universal base 360 by any conventional means. This is also applicable for the assembly of the clamp pivot 351, etc.

The embodiment illustrated in FIGS. 14-17 is provided to facilitate carrying a rifle with the mounted target acquisition assembly for substantial distances, or when a user is running with the rifle. When the rifle is carried in front, at the side or shouldered, the pivot assembly, as it is mounted on the rifle, might interfere with such applications because of its side protrusion. In the embodiment of FIGS. 14-17 this drawback is minimized through a provision of a quick release mechanism disposed between the bottom of the universal base 60T and the universal base clamp 66T on the opposite side of the red dot scope 100 (right side shoulder of universal base 60T). Certain elements of the present embodiment have been disclosed with reference to the previously discussed tactical pivot assembly and the long rifle pivot assembly and will not be repeated in this part of the application.

Figure 14:
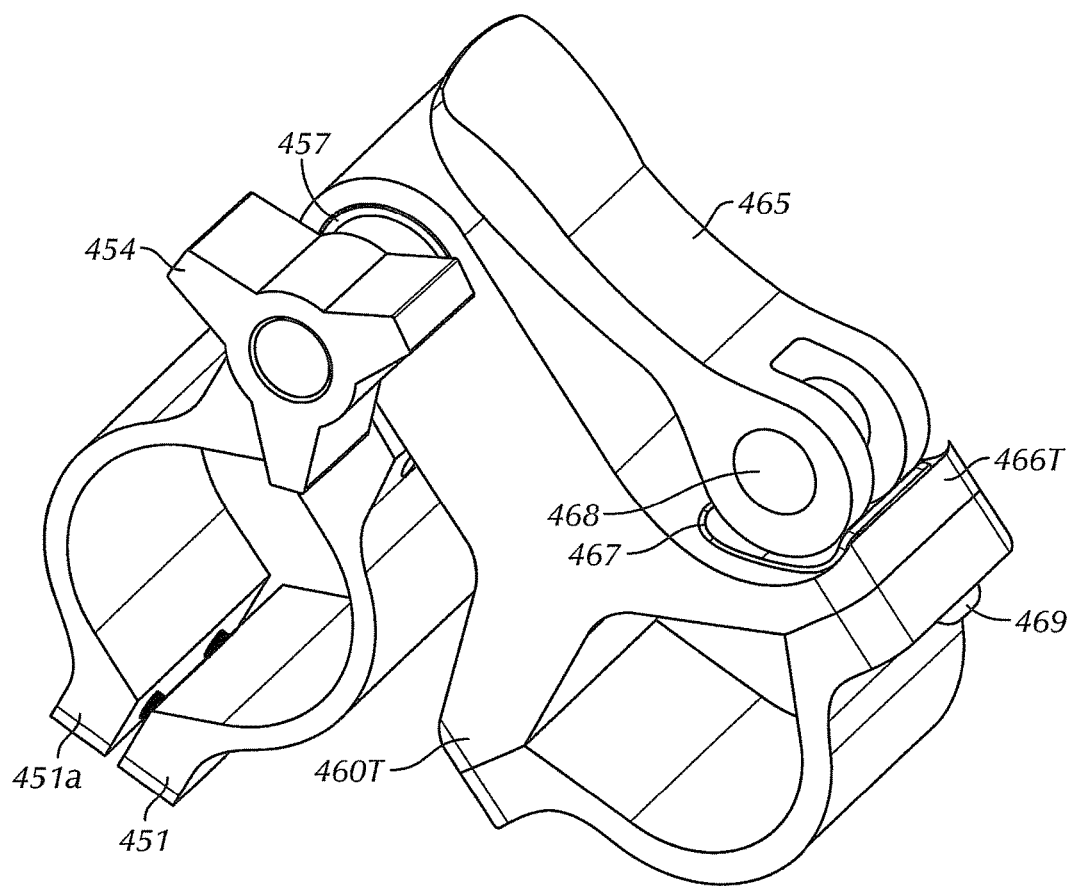
FIG. 14 is a perspective view of a tactical rifle embodiment of the pivot assembly.
Figure 15:
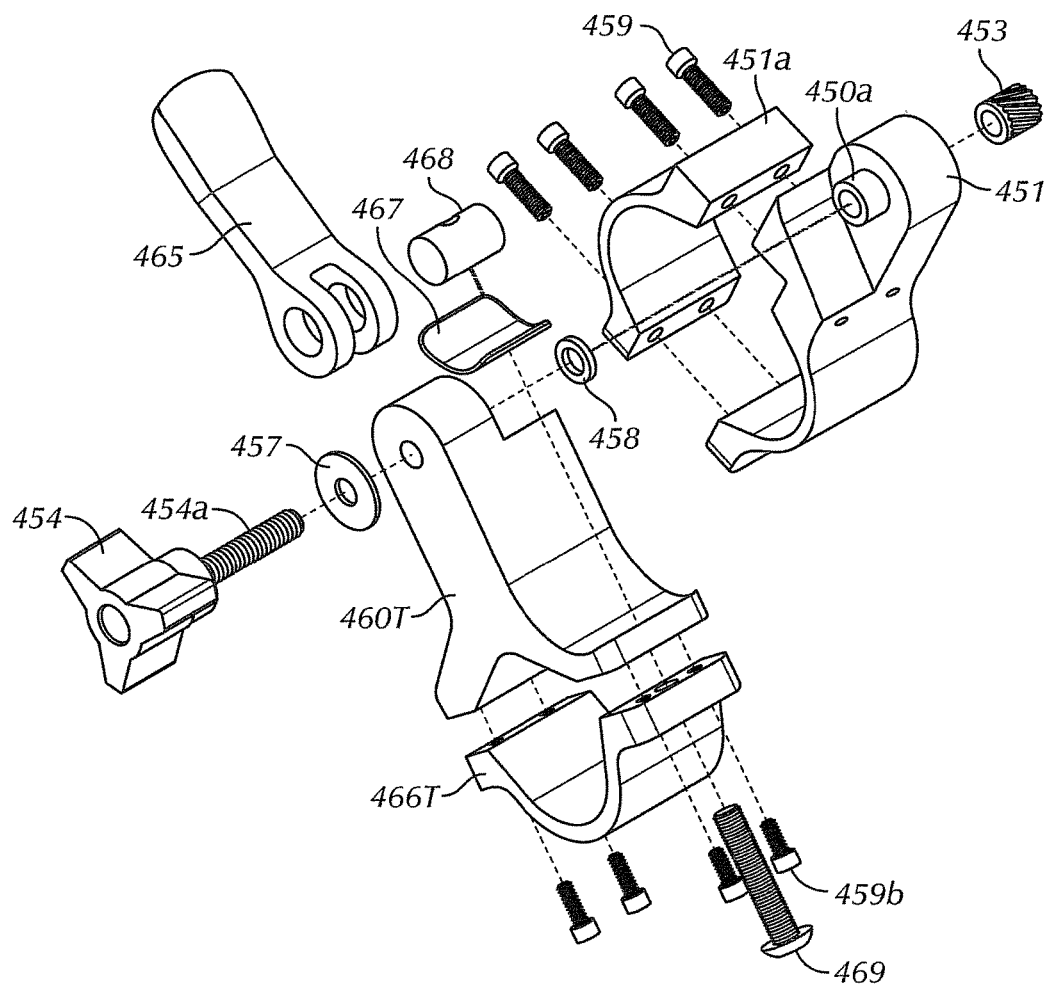
FIG. 15 is an exploded perspective view thereof.
Figure 16:
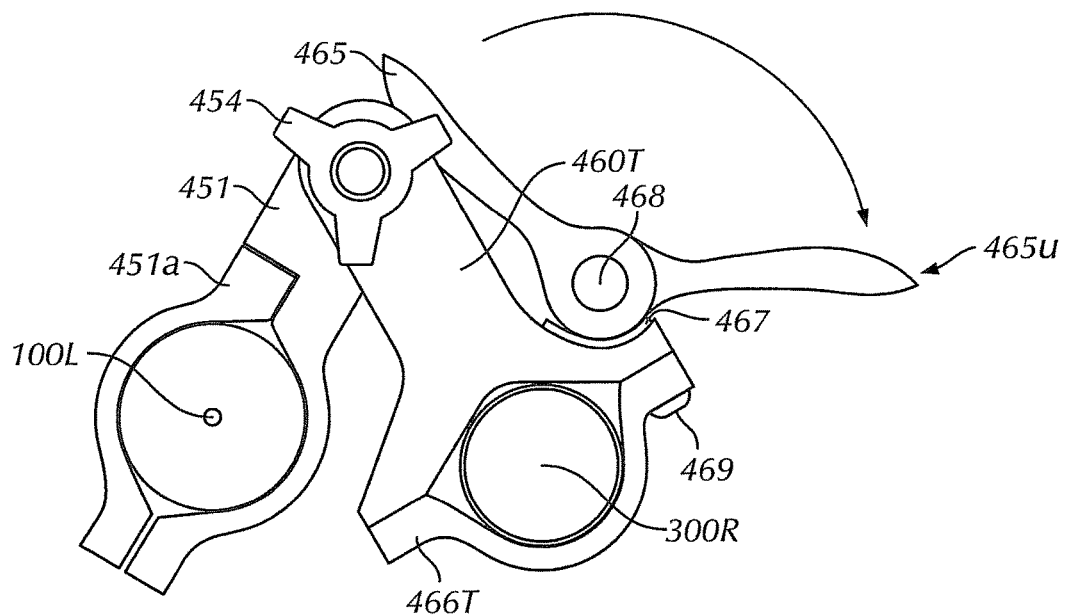
FIGS. 16 and 17 are elevational rear views thereof.
Figure 17:
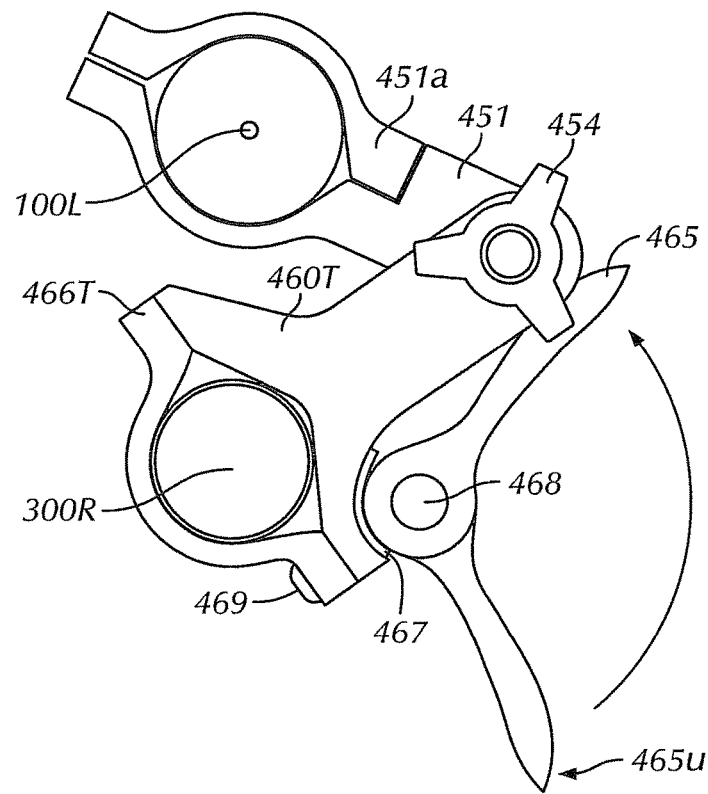
Figure 18:
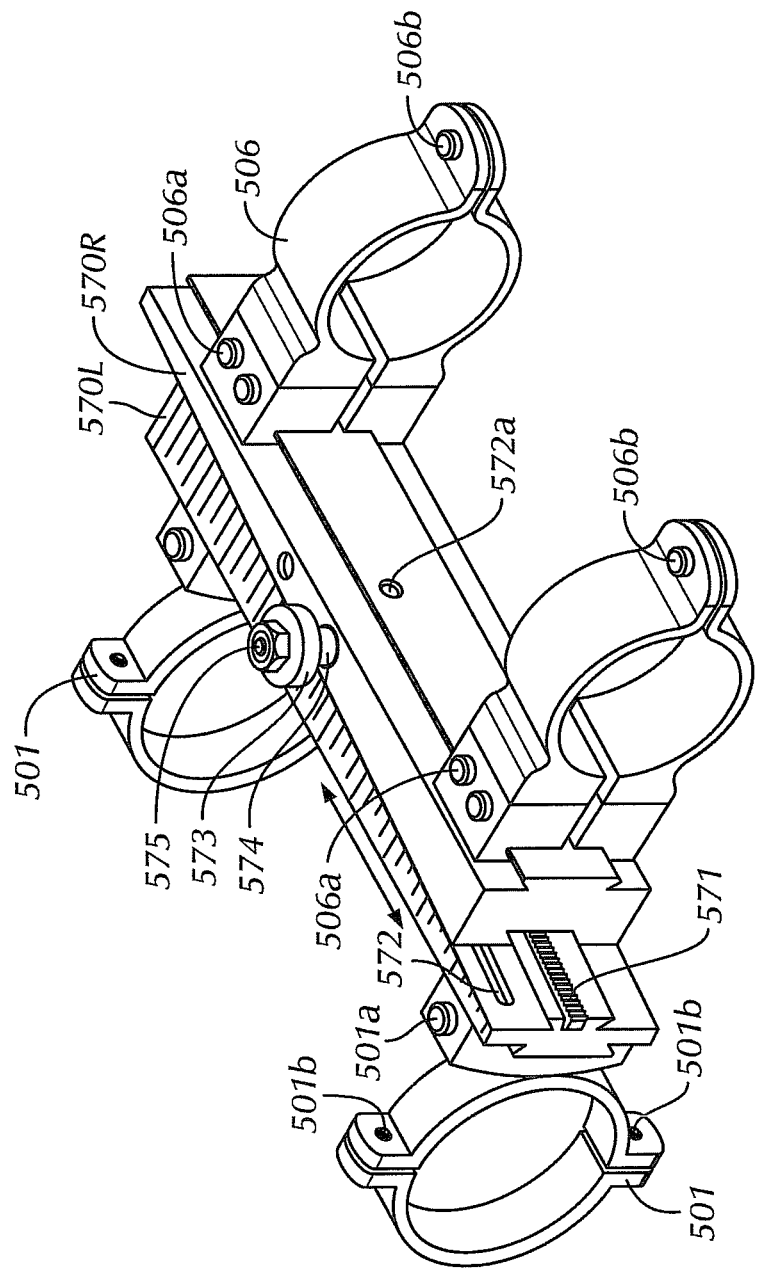
FIG. 18 is a perspective view of a wedge-shaped assembly showing mounting rings of the scopes.

As depicted in FIGS. 14 and 15, to bring the universal base unit together, the universal base clamp 466T is connected to the universal base 460T by any conventional means including the fasteners 469. A spacer 467 is inserted over it and pressed against a shoulder of the universal base 460T. As depicted in FIGS. 15-17, the cross dowel 468 is inserted into the openings at a bifurcated bottom area of the cam lever 465 and secured. In one embodiment of the invention fasteners can be used for the securing purposes, so as to be placed into the cross dowel 468 and snugged, while the cam lever is in the down position 465u. The cam lever 645 releases and squeezes one side of the universal base 460T. The securing members 469 are snugged into the bottom of the universal base 460T. The fasteners 459b attaching the other side of the universal clamp 466T to the universal base 460T, remain tight during the entire process.

FIG. 16 illustrates how the cam lever 465 upon being lowered to position 465u allows the entire pivot assembly 640T to be tilted. To accomplish this task, the rifle scope main tube 300a/300R is used as a fulcrum/pivot to where the red dot scope 100 is placed directly above the rifle scope 300. That position is then secured by raising the cam lever 465 from the position 465u to the position where the cam lever 465 touches the top of the universal base 460T, which tightens the universal base clap 466T against the universal base 460T. As depicted in FIG. 17, if there is a need for close quarters quick shot, the red dot scope 100 can be used to take that shot because the scopes are still in parallel alignment. When the need to return to the sniper mode arises, the process is reversed from FIG. 17 to FIG. 16. In this manner, the cam lever 465 is lowered, the universal base 460T, and therefore the assembly, is pivoted back to the left to its optimal IPD position. The lever is raised to lock it after the adjustment is complete. These adjustments are rather fast and take no more than a second or two.

As discussed above, when a user is walking or running with a rifle along his or her side, or when shouldering the rifle, the red dot arrangement often interfere with a body of the user. The arrangement of the embodiment of FIGS.

14-17 allows alignment of the scopes in a straight horizontal plain with the rifle. Thus, the scopes are positioned flat against the body or against the back when shouldered. The above-discussed quick release mechanism is provided to facilitate quick angle and/or radial adjustment of the entire target acquisition system, so that the red dot scope 100L is adjusted with respect to the high power scope 300R of the rifle. This mechanism provides fast adjustment to practically any desired position of the red dot scope 100L with respect to the high power rifle scope 300R. The adjustment includes a rotational motion of the assembly, including the red dot scope with respect to the longitudinal or optical axis of the rifle scope. Various radial positions of the red dot scope 100L are achieved by simply releasing and locking the cam lever 65 and the respective cam mechanism.

FIGS. 18-25, illustrate an embodiment of the invention with the wedge-shaped design assembly 500. As to FIGS. 18 and 19, the rifle scope 300 is mounted on the rifle 400 in a substantially the same way as previously discussed with respect to the embodiment of FIG. 9. To attach the wedge-shaped target acquisition assembly 500 to the rifle scope, the ring part of a set of mounting rings 506 clamp around the rifle scope tube 300a which are secured onto the rifle scope 300 by any conventional means including fasteners 506b. The jaw parts of the mounting rings 506 clamp on the outer male dovetails section of the right gear wedge 570R by any conventional means including fasteners 506a.

A set of mounting rings 501 clamps around the red dot scope 100 and the red dot scope is secured by any conventional means including fasteners 501b. The jaws of the mounting rings 501 clamp onto the outer male dovetail section of left rack wedge 570L and are secured by any conventional means including fasteners 501a.

According to the embodiment of FIGS. 18-24 the adjustment for IPD of the user by means of the wedge-shaped design assembly 500 is achieved by sliding the wedges 570R and 570L against each other. The wedges have the substantially similar angle, but are provided in the reverse relation to each other. As the wedges slide in opposing directions, the width of the assembly, or the distance from the outer edge of the right gear wedge 570R and the outer edge of the left rack edge 570L changes. As illustrated by the arrows in FIGS. 18, 20, 21 and 23, upon the movement, the distance widens when the wedges come together or narrows as they move apart.

However, the difference in the width produced by the wedges sliding against each other is not substantial, which make the assembly to be useful in the fine-tuned final adjustments. That is why a selection the right mounting rings 501 for attaching the red dot scope, and the rings 506 for attaching the rifle scope to the wedge assembly 570 is an integral part of the process for achieving the proper adjustment for the IPD of an individual.

This process begins with selecting the correct mounting rings for each scope. The red dot scope and rifle scope mounting rings are provided in many different styles. The height of a mounting ring refers to the distance from the base to the saddle of the ring. The base of the ring is the part that comes in contact with, or just floats above, the outer surface of the rail it is being clamped on. The saddle of the mounting ring is the bottom of the circler space into which the scopes fits. This is critical because the distance from the base of the mounting rings to the saddle of the mounting ring, will determine an approximate distance between the centers of the red dot scope eyepiece 104 and the center of the riflescope eyepiece 304. The sliding wedges 570L and 570R are capable of moving the red dot scope 100 and the rifle scope 300 a limited distance to complete the precise IPD setting.

Figure 24:
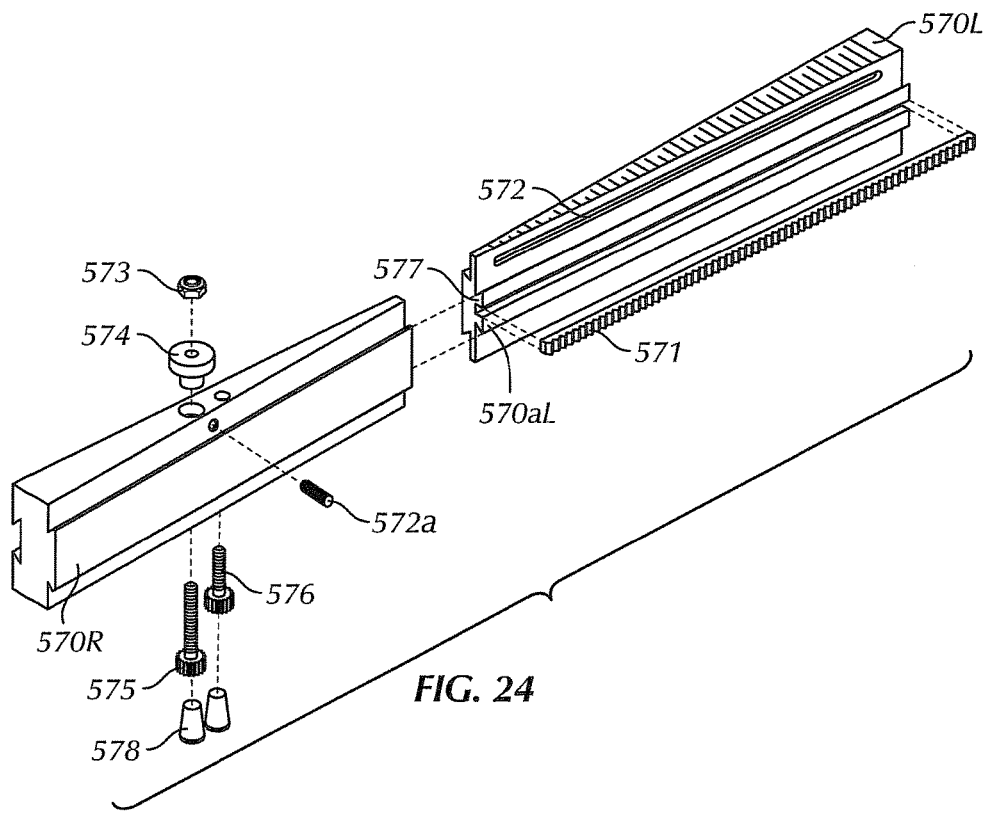
FIG. 24 is an exploded perspective view thereof.

FIG. 24 illustrates how the assembly is placed together and functions as a unit. The male dovetail 570La of left rack wedge 570L, with the rack 571 pressed in, slides into the female dovetail 570Ra of the right gear wedge 570R. The gears 575 and 576, mash with the rack 571, as the wedges 570L and 570R slide inside each other.

Figure 20:
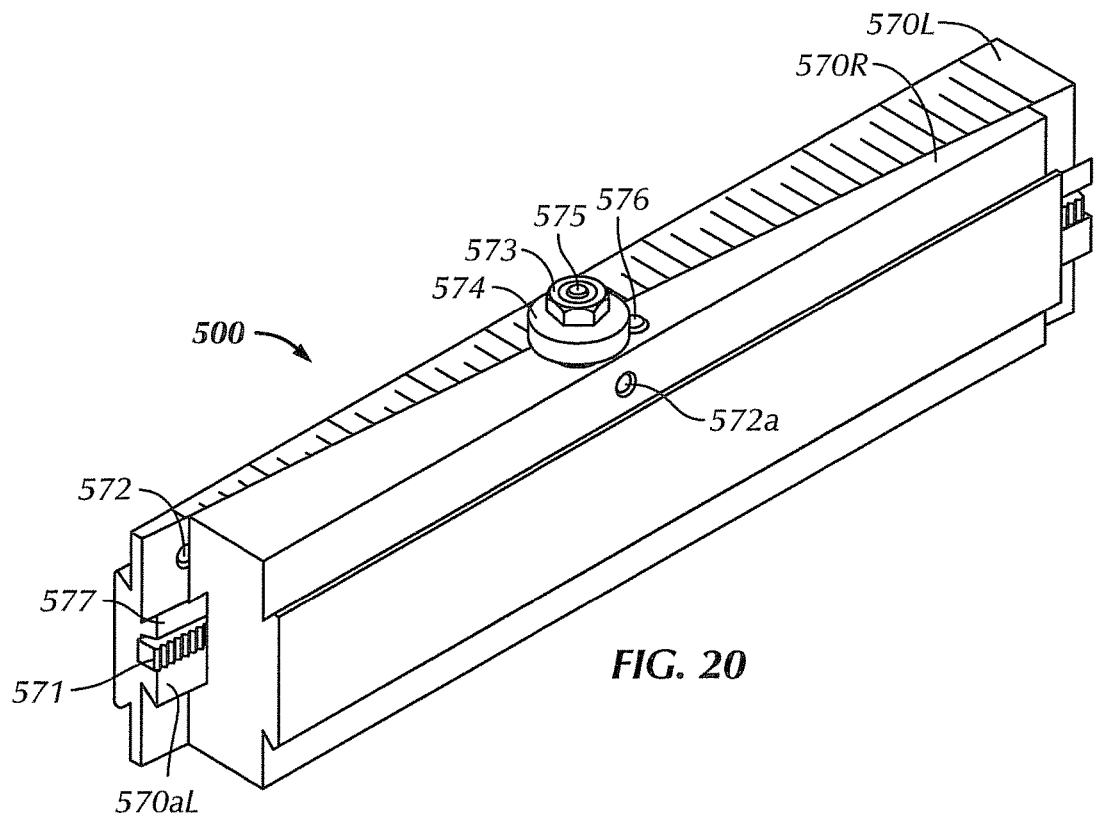
FIG. 20 is a perspective view of a wedge-shaped assembly.

The locking pinion gear shaft 575 and the idler pinion gear 576, enter from the bottom of the gear wedge 570R and closed in by the plugs 578. As locking pinion gear 575 threads penetrate the top of the gear wedge 570R, a locking knob 574 is threaded over it. Then, the locking member 573 is positioned over the locking knob 574 to keep it from being accidently released. Because the idler pinion gear 576 does not have an adjustment or locking knob, it is much shorter. However, the gear 576 follows the same installation procedure except that it barely penetrates the surface of the right gear wedge 570R. The height of both gears matches the width of the rack 571 plus the height of the gear keeper groove 577. Therefore, when the wedges are slid together and the gears 575 and 576 mash with the rack, the gears are kept in place without any additional fasteners. The fastener 572a is unscrewed when the two wedges 570R and 570L are first slid to gather. However, when they are slid together, it is screwed into the pinion wedge 570R. As illustrated in FIG. 20, this is just enough to keep the two wedges from sliding apart.

Figure 21:
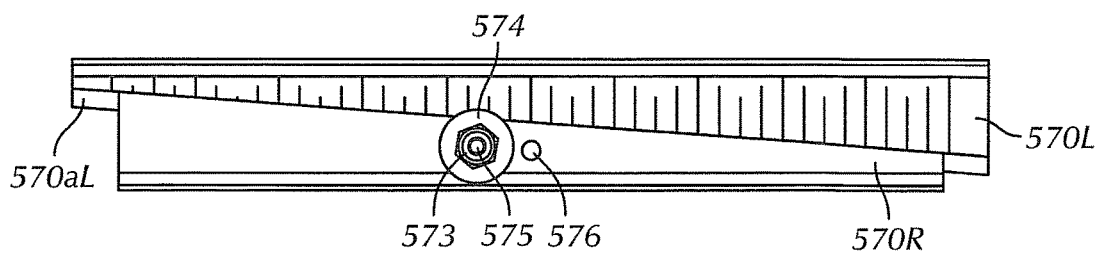
FIG. 21 is a top plan view thereof.

The operation of the wedge-shaped assembly is illustrated in FIGS. 20, 21 and 22. For the purposes of the invention, an assumption is made that since the right gear wedge 570R is attached to the rifle scope 300, it is stationary. In operation of the wedge assembly, first, locking knob 574 is loosened. Then, left rack wedge 570L is moved fore or aft as necessary. When the proper IPD is achieved, the locking member or knob 574 is tightened to achieve a positive lock. If, at this point, the red dot scope eye piece 104 is either too close or too far in relation to the rifle scope eye piece, the fasteners 501a are loosened, the red dot scope 100 with its rings 501 tightly attached, is slid to a position where it is comfortable. Then the fasteners 501 are tightened again.

Figure 19:
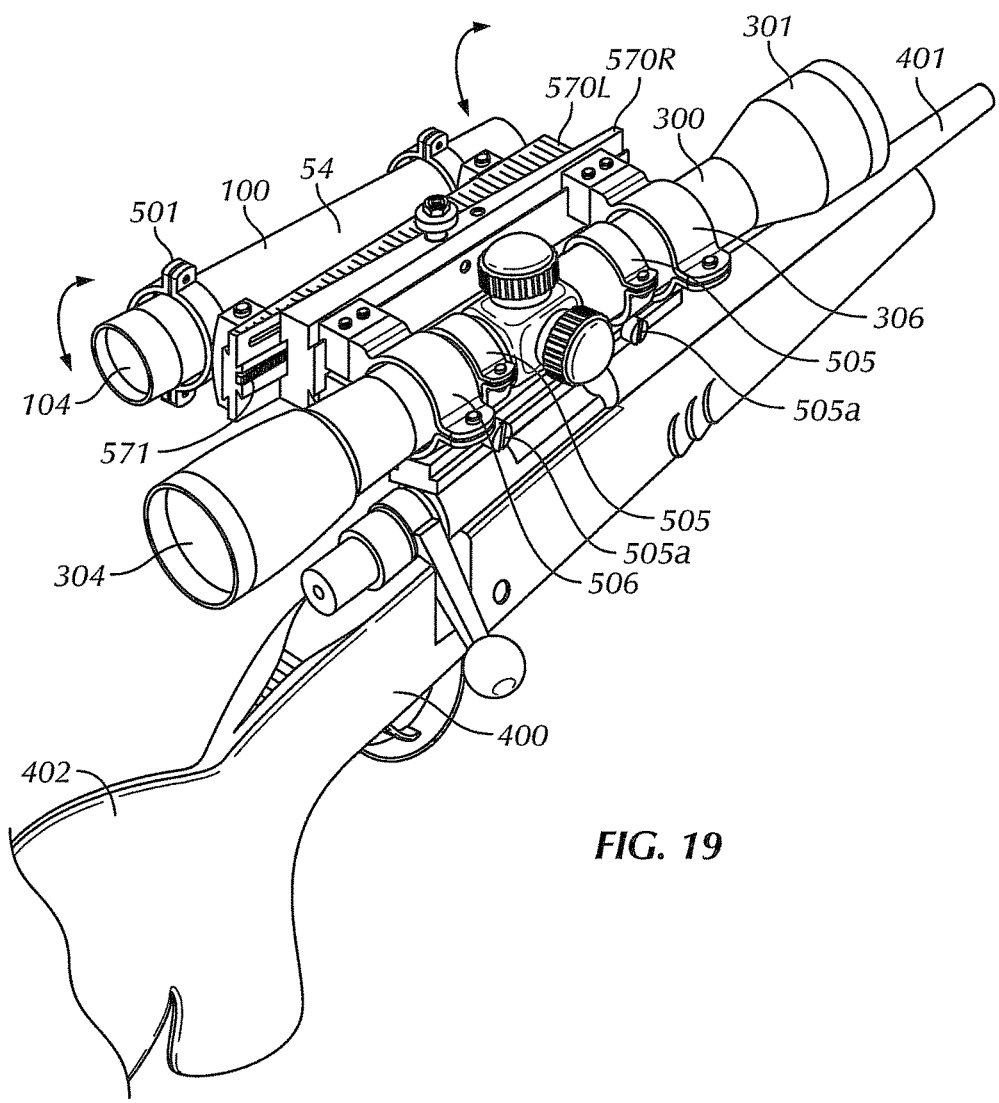
FIG. 19 is a perspective view of the wedge-shaped assembly secured to a riflescope on the right and a red dot scope on the left.

Referring now back to the assembly of FIG. 19, which is provided to accommodate a need for a more refined adjustment. Because the shooter is facing the two scopes at an angle and not at a face-on position, the IPD will be slightly narrower (2 mm-3 mm) than a head-on IPD. An advantage of the wedge-shaped assembly 570 is that it provides a simple process of loosening the locking knob 574, then adjusting for the difference by moving the left wedge slightly and re-tightening the locking knob 574. In view of interference of the rifle stock 402, in order for the shooter to look through the center of the riflescope 300, the head tilts at an angle towards the rifle, this places the left eye above the right eye. As illustrated by the arrows on the front and back of the red dot scope in FIG. 19, to adjust for the tilt of the head against the rifle stock 401, fasteners 506b should be loosened, and the red dot scope will be pivoted up using the riflescope 300 as the pivot point center. When the proper angle is achieved, the fasteners 506b will be tightened again for a final positive lock.

The wedge-shaped assembly 500 illustrated in FIGS. 18-24 has a lower profile/extension than the pivot design discussed above, and provides a precise way of adjusting the IPD. The assembly includes a pair of substantially identical wedges disposed in the reversed order with respect to one another. The wedges are moved fore and aft to each other, so as to widen or narrow the distance between the outer sides thereof, depending on the directions of the slide which are associated with the rings receiving the individual scopes. Sliding of wedges one against the other is resulted in a very precise incremental adjustment of the IPD. In operation, the outside surfaces of the wedges remain in a parallel to each others position. This maintains the parallel focal plains of the red dot scope and the high power scope at any distance therebetween. Thus, as the wedges slide against each other, a parallel disposition of both focal plains is constantly maintained.

Figure 25:
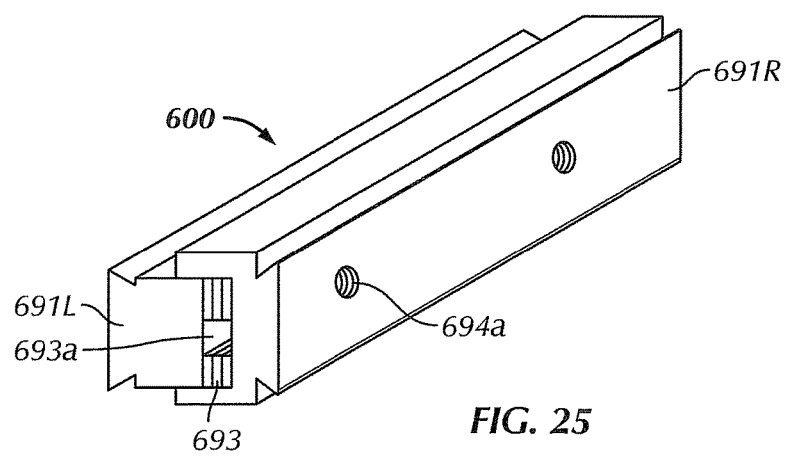
FIG. 25 is a perspective view of the shim assembly.
Figure 26:
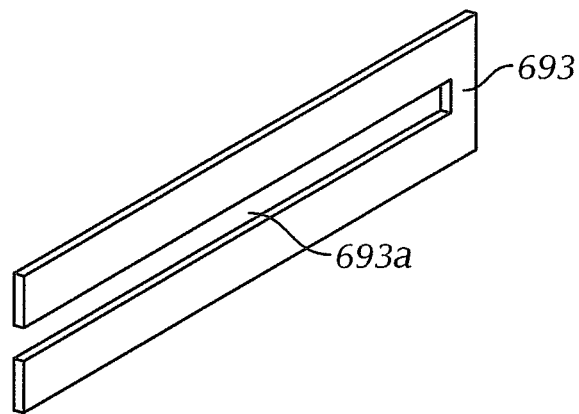
FIG. 26 is a perspective view of a single shim.
Figure 27:
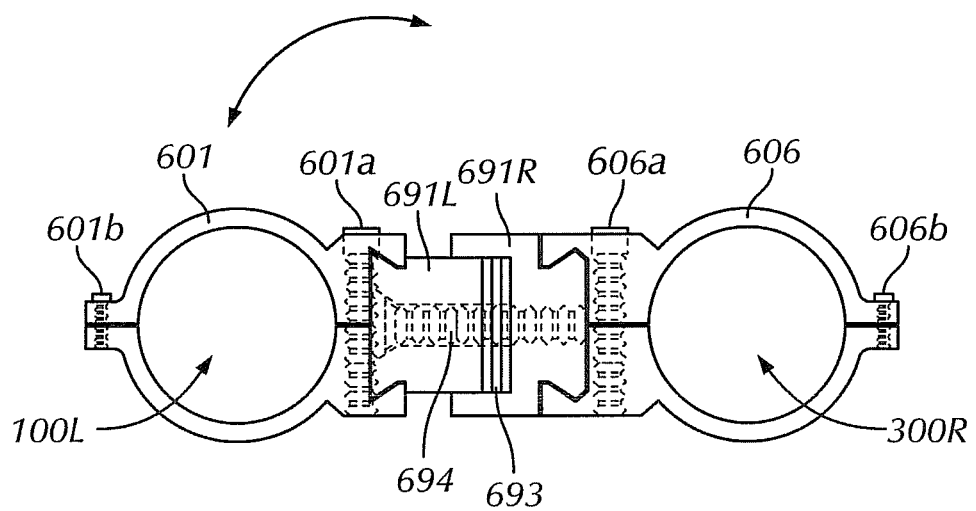
FIG. 27 is a rear elevational view of the shims assembly showing mounting rings.

Referring now to FIGS. 25, 26 and 27 illustrating a shim based embodiment or assembly 600 of the target acquisition system. FIG. 25 shows the left side rail 691L fitting into the right side rail 691R with multiple shims 693 used as spacers between the two rails. FIG. 26 shows the shim or spacers 693 with the cut-out 693a facilitating an insertion into the rails. In this manner, the shim can pass through the space between the left rail 691L and the right rail 691R and accommodate the tightening fasteners 694.

FIGS. 25 and 27 illustrate that the adjustment can be made by increasing or decreasing the number of the used shims 693. When the proper IPD is achieved the locking fasteners are tightened to achieve a positive lock.

Although no rifle or scopes are drawn in FIGS. 25, 26 and 27, a reference can be made to FIG. 19 in assumption that similar problems exist and similar solutions are applicable to the shim-based assembly 600 as the wedge-shaped assembly 500.

In referring to and combining the embodiments in FIGS. 19 and 27 the additional adjustments are needed because the shooter is facing the two scopes at an angle and not at a face-on position, the IPD will be slightly narrower (2 mm-3 mm) than a head-on IPD. In the shim-based assembly 600, the process for the final IPD adjustment is simply accomplished by loosening the locking fasteners 694a, adding or removing shim(s) and tightening the locking fasteners 694a. In addition, because the rifle stock 402 is in the way, in order for the shooter to look through the center of the riflescope 300, the head tilts at an angle towards the rifle, which puts the left eye above the right eye. As the arrow over the red dot scope ring 601 in FIG. 27, to adjust for the tilt of the head against the rifle stock 402, fasteners 606b will be loosened, the red dot scope will be pivoted up using the rifle scope 300 as the pivot point center. When the proper angle is achieved, the fasteners 306b will be tightened again for a final positive lock.

The shim-based embodiment of FIGS. 25-27, includes two rails forming a dovetail connection, one fitting inside the other. The outside surfaces of the rails are parallel to each other. The arrangement allows adjustment for IPD. The distance between the two rails is set by either adding or removing shims disposed within the space between the rails and then attaching them together. The arrangement of this embodiment is quite reliable because of the simplicity of the design and the absence of moving parts.

Figure 28:
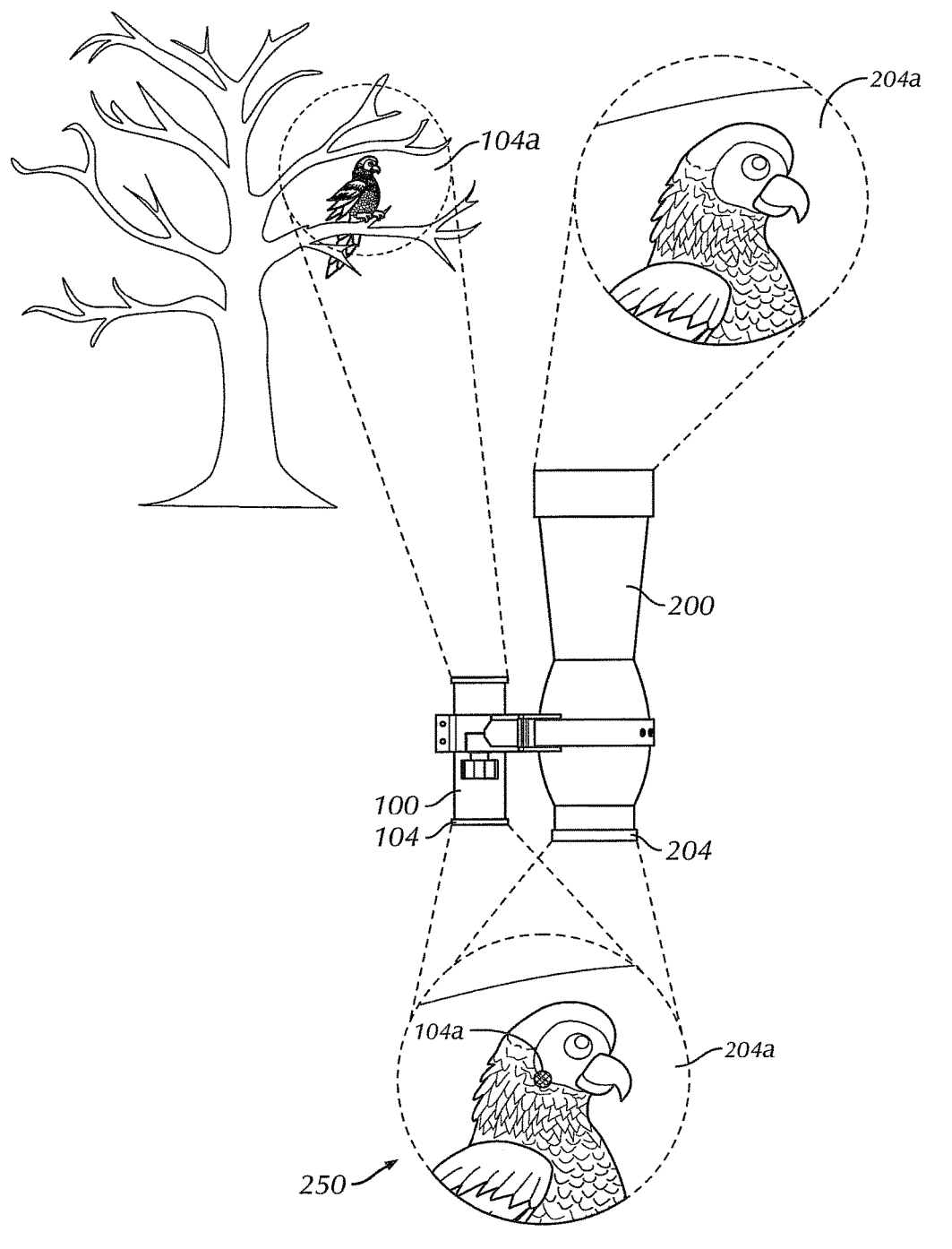
FIG. 28 is a schematic depiction of the principles of the invention.

Referring now to FIG. 28 illustrating principles of the invention. The left eye of a user is looking through the eyepiece 104 of the zero magnification or red dot scope 100 and finds an object such as a bird for example. The right eye is simultaneously looking through the eyepiece 204 of the high power scope 200. The result is the immediate viewing of the magnified view 204A of the bird object. The longer the viewer looks at the magnified view, the less he/she notices the red dot. At the moment the bird flies away, the brain of the user shifts some of its focus from the magnified view to the reemerging red dot in the wide field of view of the red dot eye piece 104. The result is that the target does not disappear from the magnified view.

It is illustrated in FIG. 28 that looking with the left eye through the zero magnification or the red dot scope 100 the user acquires a wide field view 104A and sees a large area around the bird object. On the other hand, the right eye looking through the high power scope 204 acquires an enlarged view 204A of the bird object. The right eye has a much narrower field of view 204A and only sees a part of the object, such as for example a head of the bird. The resulted view 250 is the combination of the zero magnification of the red dot view 104a and the magnified view 204a provided by the system of the invention.

The invention claimed is:

1. A visual target acquisition scope system for adjustable connection between a zero magnification scope producing 1× magnification image viewed with a first eye of a user and a high power scope producing a magnified image viewed with a second eye of the user, the system comprising:
   a system base including a power scope receiving arrangement adapted to receive a housing section of said high power scope therein;
   a clamp portion pivotally connected to said system base, said clamp portion including first and second clamping arms each having interior surface defining in combination a receiving space therebetween, said receiving space adapted to adjustably receive said zero magnification scope such that an elongated exterior surface of a housing of said zero magnification scope is accommodated in said receiving space and engages the interior surfaces of said first and second clamping arms;
   an adjustment locking mechanism connecting and controlling said system base and said clamp portion, said adjustment locking mechanism being adapted to bring optical axes of said scopes disposed in said power scope receiving arrangement and in said receiving space to a distance therebetween corresponding to an interpupillary distance between pupils of the first and second eyes of the user; and
   an arrangement for allowing simultaneous use of said zero magnification scope and said high power scope by a user, so as to simultaneously find a view of a target and maintain the target at an enlarged field of view, so that while the user is looking at an object through said zero magnification power scope with the first eye and looking at the object through the high power scope with the second eye, the target visible to the first eye is simultaneously visible to the second eye, so as to provide immediate acquisition and viewing of the object through the high power scope by the second eye.

2. The system of claim 1, wherein an optical axis of the zero power scope is constantly maintained to be parallel to an optical axis of the high power scope.

3. The system of claim 2, wherein said zero magnification scope is a red dot scope providing a red dot point of reference on the optical axis thereof, so that when the object is viewed simultaneously by said first and second eyes, while the red dot is placed on the object, said object simultaneously is visible to the second eye within said high power scope and remains visible to the second eye as long as it remains visible to the first eye through said zero magnification scope.

4. The system of claim 1, wherein said power scope receiving arrangement of said system base comprises a flexible member associated with a locking mechanism, said flexible member surrounding said housing section of said high power scope to provide tightening therearound thereby connecting said high power scope to said system base.

5. The system of claim 1, wherein said first clamp arm comprises a clamp pivot and said second clamp arm comprises a clamp saddle, said clamp pivot and said clamp saddle defining said receiving space therebetween, such that said the elongated exterior surface of said zero magnification scope engages said clamp pivot and said clamp saddle when accommodated in said receiving space.

6. The system of claim 5, further comprising a pivot assembly initially positioned at the high power scope, wherein said clamp pivot and said zero magnification scope positioned between the clamp pivot and the clamp saddle are adapted to be rotated by said user to adjust for interpupillary distance, and wherein said system base is adapted to be rotated by the user until a distance between a center of said zero magnification scope and a center of the high power scope match an interpupillary distance of the user.

7. The system of claim 5, wherein the system base and the pivot assembly are placed together by an adjustment locking knob engaging a hole at a top part of the system base; and the clamp pivot being brought together with the system base when a boss formed at a top portion of the clamp pivot is received within a bore provided at the top part of the system base.

8. The system of claim 1, wherein the exterior of said zero magnification scope is provided with a rail member, and wherein said clamp portion is a T-shaped clamp, said T-shaped clamp including:
 a clamp portion adapted for connection with said rail member and allowing for longitudinal motion of said zero magnification scope relative to said T-shaped clamp; and
 a pivot portion, pivotally connected to said system base thereby adapted to allow relative rotation between said zero magnification scope and said high power scope,
 wherein said T-shaped clamp inhibits rotational motion of the zero magnification scope about the optical axis thereof.

9. The system of claim 1, further comprising a wedge-shaped target acquisition assembly, said assembly comprising a pair of substantially similar wedge members disposed in a reverse relation to each other and adapted to slide in opposite directions in such a manner that an outer periphery of the assembly widens when the wedge members are brought together, the outer periphery of the assembly narrows when the wedge members are moved apart.

10. The system of claim 9, wherein sliding of the wedge members with respect to each other results in an incremental adjustment of the interpupillary distance.

11. The system of claim 9, wherein outer surfaces of the wedge members remain substantially parallel to each other, so as to maintain a substantially parallel relationship between the focal planes of the zero magnification scope and the high power scope at any distance therebetween, and as the wedge members slide against each other a parallel relationship of the focal planes of the scopes is constantly maintained.

12. The system of claim 1, further comprising a shim-based target acquisition assembly comprising first and second rails adapted for engagement with each other in a dovetail connection and forming an operational space therebetween, said operational space receiving a plurality of shims,
 wherein said first rail is connected to said zero magnification scope and said second rail is connected to said high power scope,
 wherein a number of shims in said plurality of shims defines the size of said operational space and a distance between said first and second rails corresponding to said size, such that adjustment of said distance between said first and second rails and a respective interpupillary distance is carried out either by adding or removing the shims from the operational space formed between the rails.

13. The system of claim 1, wherein optical or focal axes of the scopes are set in substantially parallel alignment, and distance between the focal axes of the scopes corresponds to a predetermined distance between the pupils of the user eyes.

14. A method of rapidly acquiring and maintaining a visual target by means of a system providing an adjustable connection between a zero magnification scope producing 1× magnification image viewed with a first eye of a user and a high power scope producing a magnified image viewed with a second eye of the user, said system comprising a system base including a power scope receiving arrangement, the system base being pivotally connected to a clamp portion including a clamp saddle and a clamp pivot each having interior surface defining in combination a receiving space therebetween, the method comprising of the following steps:
 accommodating a housing section of the high power scope within the scope receiving arrangement of the system base;
 accommodating an elongated exterior of a housing of the zero magnification scope in the receiving space, such that the elongated exterior engages the interior surfaces of the clamp pivot and the clamp saddle;
 setting a distance between said scopes to accommodate an interpupillary distance of the user, by rotating said clamp portion, together with said zero magnification scope positioned in said receiving space, about said clamp pivot; and
 rotating the system base until a distance between an optical center of said zero magnification scope and an optical center of the high power scope matches the interpupillary distance of the user,
 whereby while the user is looking at an object through said zero magnification power scope with the first eye and looking at the object through the high power scope with the second eye, the target visible to the first eye is simultaneously visible to the second eye, so as to provide acquisition and viewing of the object through the high power scope by the second eye.

15. The method of claim 14, wherein said zero magnification scope is a red dot scope, the method further comprising a step of placing a red dot generated by the zero magnification scope on the object as the object is being viewed.

16. The method of claim 15, wherein when the object is viewed simultaneously by said first and second eyes, and the red dot is placed on the object, said object is visible by the second eye within said high power scope, and remains visible by the second eye as long as it remains visible to the first eye through said zero magnification scope.

* * * * *